Figure 1:
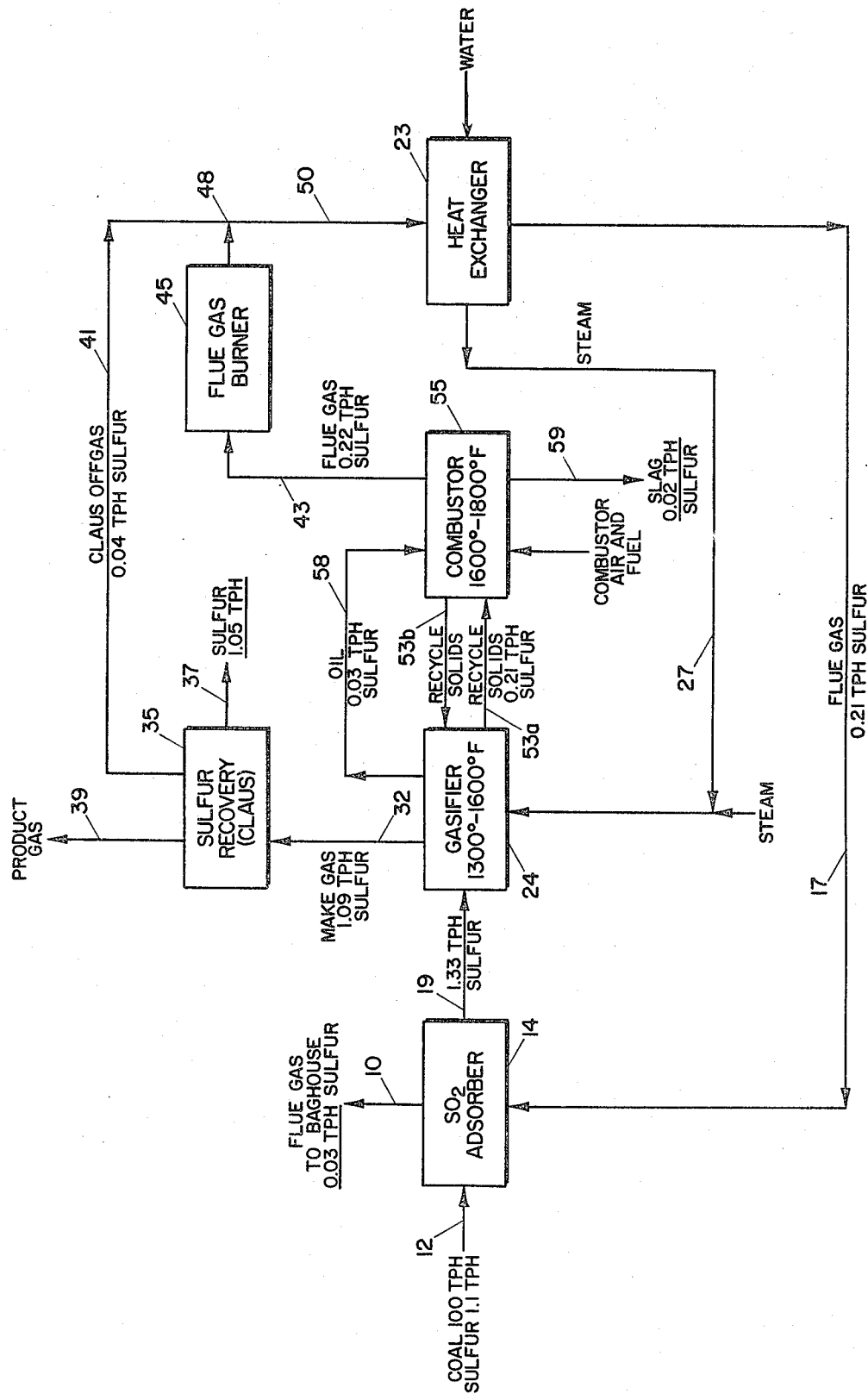

United States Patent [19]

Friedman

[11] 4,302,218
[45] Nov. 24, 1981

[54] PROCESS FOR CONTROLLING SULFUR OXIDES IN COAL GASIFICATION

[75] Inventor: Louis D. Friedman, New Brunswick, N.J.

[73] Assignee: FMC Corporation, Philadelphia, Pa.

[21] Appl. No.: 159,546

[22] Filed: Jun. 16, 1980

[51] Int. Cl.³ ............................................. C10J 3/00
[52] U.S. Cl. ............................ 48/197 R; 48/202; 55/73; 55/74; 55/79; 252/373; 423/244; 423/574 R
[58] Field of Search .............. 48/197 R, 202, 210; 252/373; 423/574 R, 576, 244 R, 563; 55/73, 74, 79, 77

[56] References Cited

U.S. PATENT DOCUMENTS

| | | | |
|---|---|---|---|
| 3,345,125 | 10/1967 | Kruel et al. | 423/244 |
| 3,495,941 | 2/1970 | Van Helden | 423/564 |
| 3,502,427 | 3/1970 | Johswich | 252/445 |
| 3,563,704 | 8/1968 | Torrence | 55/73 |
| 3,886,411 | 7/1975 | Marion et al. | 252/373 |
| 3,917,469 | 11/1975 | Cotter et al. | 55/73 |
| 3,966,633 | 6/1976 | Friedman | 48/202 |
| 3,966,634 | 6/1976 | Sacks | 48/202 |
| 4,082,519 | 4/1978 | Steiner | 48/202 |

FOREIGN PATENT DOCUMENTS 749940  1/1967  Canada ........................ 423/244 R Primary Examiner—S. Leon Bashore
Assistant Examiner—Michael Goldman
Attorney, Agent, or Firm—Robert D. Jackson; Eugene G. Seems

[57] ABSTRACT

In a fluidized coal gasification process in which heat for the gasifier is provided by recycle combustor residue from a slagging combustor, $SO_2$ in the combustor's flue gas is removed by contacting the flue gas with the incoming coal feed whereby the $SO_2$ is adsorbed on the coal and converted to $H_2S$ in the gasifier. Sulfur is recovered from the $H_2S$ in a Claus Plant.

7 Claims, 1 Drawing Figure

PROCESS FOR CONTROLLING SULFUR OXIDES IN COAL GASIFICATION

This invention relates to coal gasification, and in particular to improvements in preventing sulfur in the coal from contaminating the environment.

The gasification of coal with steam to produce a mixture of hydrogen and carbon monoxide (synthesis gas) is well known in the fuel arts and is extensively described in the technical and patent literature. Developed during the latter half of the 19th Century, the technology supplied gas for household and industrial usage. After several years, probably beginning in the 1920's, coal gasification went into decline as fuel and synthesis gas were more economically provided by natural gas and petroleum. However, the recent precipitous rise in cost of these resources coupled with the recognition they are being rapidly depleted, has revived interest in coal as a raw material from which synthetic fuels and chemical feedstocks can be produced.

Generally speaking, there are two techniques which are used in carrying out coal gasification. In the fixed bed process, which was developed and used first, a fuel bed is supported by a grate or other means while steam is admitted below the bed. Ash residue is discharged at the bottom and product gas removed overhead. In the more recent fluidized bed process, a carbonaceous charge is reacted in the form of a dense turbulent mass of finely divided solids fluidized by the gaseous reactants and products. Product gas passes overhead and is recovered after being freed of entrained fines solids.

Heat for the highly endothermic steam-carbon reaction is supplied by combustion of carbonaceous constituents of the charge with air and/or oxygen. This can be effected either in the gasifier vessel itself, or in a separate heater, and the resulting hot combustion residue transferred as sensible heat to the gasifier. Since coal always contains some sulfur, deriving gasification heat in this manner results in flue gases containing sulfur dioxide, although small quantities of sulfur trioxide may also be present. Considering that the minimal commercial gasification plants now being contemplated will process about 25,000 tons of coal per day, an economical and practical means of controlling such sulfur dioxide emissions is a manifest need.

One well known technique for removing sulfur dioxide from waste gases and one with which the present invention is concerned, is by means of carbonaceous adsorbing agents such as activated carbon and so-called half coke made from peat, brown coal, bituminous coal and oxidized bituminous coal. In this process, the sulfur dioxide ($SO_2$) is first adsorbed by the carbonaceous agent and then oxidized thereon to sulfur trioxide ($SO_3$), oxygen always being present in small amounts in flue gas, and the $SO_3$ then converted to sulfuric acid by reaction with moisture. The spent carbon is then regenerated at about 300° C. whereupon the sulfuric acid is reduced by the carbon to reform sulfur dioxide according to the following reaction:

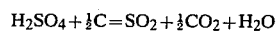

$$H_2SO_4 + \tfrac{1}{2}C = SO_2 + \tfrac{1}{2}CO_2 + H_2O$$

Although the removal of sulfur dioxide by adsorption on carbonaceous agents is technically feasible, the economics of the process are not favorable, particularly in the context of large commercial operations. The incorporation of such adsorption systems in full scale gasification plants would require providing and maintaining enormous inventories of adsorbent carbon to take care of sulfur dioxide emissions; banks of absorption towers and regeneration units would have to be installed. Moreover, after removal from the adsorbent, the sulfur dioxide must be converted into a form which can be stored or used as a byproduct.

In the well known Reinluft Process, the $SO_2$ is recovered as sulfuric acid from the spent carbonaceous adsorbent. However, sulfuric acid is a high density liquid which is expensive to ship and handle. Nor is it a suitable sulfur compound for storing as a waste product because of its highly corrosive nature.

Improved adsorbent carbons have been developed as well as various other adsorbing substrates but these new materials are generally more costly than the lower grade of wood and coal carbons. Manifestly, the use of dry adsorbent processes in the present state of the art, to control sulfur dioxide emissions in the forthcoming large scale gasification plants is not feasible.

It is, therefore, an object of the present invention to effect removal of sulfur dioxide from flue gas produced in conjunction with coal gasification without the difficulties and disadvantages associated with prior methods of purifying gases in the manner described aforesaid.

It is a further object of the invention to provide a method of removing sulfur dioxide from a flue gas stream produced in a coal gasification plant which method can be carried out on a large industrial scale in a particularly simple and economical manner.

It is still a further object of the invention to provide a method of removing sulfur dioxide from a flue gas stream produced in a coal gasification plant with a carbonaceous adsorbing agent under conditions whereby the said carbonaceous adsorbing agent does not have to be reactivated.

Other objects and purposes will become apparent subsequently herein.

It has now been found that in the gasification of carbonaceous solids with steam to give product gas containing carbon monoxide and hydrogen wherein the gasification is effected by feeding a stream of said solids and steam into a reaction zone and wherein there is produced in conjunction with said gasification a flue gas containing sulfur dioxide, an improvement of removing the sulfur dioxide from said flue gas is realized comprising the steps of:

(1) contacting said flue gas with at least a portion of said stream of carbonaceous solids so as to adsorb said sulfur dioxide thereon and produce carbonaceous solids charged with sulfur dioxide and purified flue gas;

(2) venting the purified flue gas;

(3) introducing the so charged carbonaceous solids into said reaction zone whereby the adsorbed sulfur dioxide is reduced to free hydrogen sulfide whereby there is formed a gaseous mixture of said hydrogen sulfide with product gas;

(4) introducing said gaseous mixture into a separation zone wherein the hydrogen sulfide is removed from said gaseous mixture; and (5) recovering said product gas substantially free of sulfur.

In carrying out the process of the invention, sulfur dioxide laden flue gas from a coal gasification plant is contacted with incoming coal feed until substantially all of the sulfur dioxide has been adsorbed on the coal. In general, a contact interval of from about 0.5 to 15 minutes at flow rates of from about 0.1 to about 1.0 feet/- second suffices to remove over 90% (by weight) of the sulfur dioxide from the flue gas. Such removal rates will also vary with the surface area of the coal and this in turn will depend on particle size. Generally, the particle size of the coal can vary from about 45 to about 2,000 microns. Even flue gases containing large amounts of sulfur dioxide, such as those produced from burning high sulfur coals, are effectively purified by the process of the invention. For instance, initial sulfur dioxide concentrations of 1000 to 20,000 ppm can be satisfactorily treated.

Adsorption of sulfur dioxide by active carbonaceous materials is temperature dependent and in this connection the adsorption efficiencies herein are satisfactorily achieved in the range of about 70° to 300° F., while a narrower range of about 150° to 225° F. is preferred. In maintaining these temperature ranges, the temperature of the flue gas, heat of adsorption and moisture content of the coal are taken into account. Since coal normally contains at least some moisture, hot flue gas can be utilized to evaporate such moisture and thereby lower the temperature of the flue gas whereby it falls within the range aforesaid. The present invention thus solves two problems attendant the operation of a coal gasification plant:

(1) removing sulfur dioxide from flue gas, and
(2) drying the incoming coal feed. Of course in those relatively rare instances wherein the coal contains low moisture, the flue gas entering the contact zone should not appreciably exceed the contact temperature range since evaporative cooling will be minimal for such low moisture coals. A flue gas having a temperature range of about 400° F. to 1,000° F. will in general provide the requisite heat requirements. Flue gas temperatures in the upper range will be employed when processing lignite which contains large amounts of moisture.

In a coal gasification plant, flue gas is generated as the result of burning a portion of the coal feed to provide gasification heat. The flue gas may come directly from the combustor or it may emanate from other points in the coal gasification plant. For instance, the primary flue gas may be diverted through heat exchangers or used to run turbines for power recovery. Flue gas flow rates and coal delivery are integrated whereby the requisite contact temperatures are provided while simultaneously removing water from the coal. By taking advantage of the sensible heat in the flue gas to dry the coal, the process of the invention does not add to the thermal load of the gasification plant.

The contacting of the coal with the flue gas is carried out in the known manner of contacting gases with solids. Thus, the coal can be arranged in a downwardly moving bed and the flue gas introduced countercurrently from below the bed. Another suitable technique is to provide a fluidized bed of the coal particles maintained in the fluidized state wherein the flue gas is added to the fluidizing atmosphere.

Particle size of the coal is not particularly critical provided the overall size range specified aforesaid is maintained since a continuing supply of incoming coal feed is available for treating the flue gas and therefore high surface area per unit volume is not needed as in the prior art adsorption processes which are limited to a fixed supply of active carbon requiring regeneration. Where the contact zone is a fluidized bed, the coal should be of a size suitable for fluidization, i.e., up to about $\frac{1}{8}$ inch. Where a moving bed is used, the coal particles can be larger, i.e., up to about $\frac{1}{4}$ inch.

Product gas is conveyed from the gasifier to an alkaline absorption tower where the hydrogen sulfide is removed by conversion to sulfide salts and the resulting purified synthesis gas recovered. The sulfide salts are reacted to give $H_2S$ which is sent to a Claus plant and converted into elemental sulfur. Alkaline absorption tower and Claus plants are standard chemical processing units for removing gaseous sulfur compounds from waste gases and for converting $H_2S$ to sulfur, respectively.

The drawing depicts a flow diagram of a coal gasification plant incorporating the process of the invention for removing sulfur dioxide from combustor flue gas used to heat recycle solids in a fluidized gasifier.

The data in the drawing is based on the weight of dry lignite feed charge, since this simplifies determining material balances; sulfur dioxide flow rates are in terms of elemental sulfur. In a commercial operation the coal would be dried by the sensible heat in the flue gas as previously explained. In the drawing, a stream of coal particles 12 containing 1.1% by weight of sulfur on a dry coal basis is fed at a rate of 100 tons/hour into a sulfur dioxide adsorber 14 through which passes flue gas stream 17 exiting from heat exchanger 23 and delivering 0.26 tons/hour of sulfur. The sulfur dioxide adsorber 14 is desirably a moving bed of coal particles flowing downwardly in countercurrent relationship with upwardly flowing flue gas stream 17 entering the bottom of said vessel. As flue gas 17 passes upwardly through sulfur dioxide adsorber 14, the sulfur dioxide is adsorbed by the fluidized coal particles therein. Purified flue gas 10 is recovered from the vessel overheads, sent to a baghouse for fines removal and then vented to atmosphere. The sulfur content of the vented flue gas is 0.03 tons/hour corresponding to a recovery efficiency of 97%. The partially dried sulfur dioxide charged coal particles 19 emerge from the sulfur dioxide adsorber 14 at a flow rate corresponding to 1.33 tons/hr. of combined indigenous and adsorbed sulfur and enter fluidized gasifier 24 which is fluidized by steam in line 27. In the gasifier 24, steam reacts at 1300° to 1600° F. with the sulfur dioxide coal particles to form synthesis gas (CO and $H_2$) while while the sulfur dioxide is reduced to hydrogen sulfide. 1.09 tons/hour of sulfur as hydrogen sulfide in the make gas 32 exits from gasifier 24 and enters sulfur recovery zone 35 which delivers 1.05 tons/hour of sulfur 37 and purified product gas 39. Sulfur is desirably recovered from the $H_2S$ using the well known Claus process. Flue gas stream 17 is made up of Claus offgas 41 containing 0.04 tons/hour of sulfur and combustor flue gas 43 containing 0.22 tons/hour of sulfur. Combustor flue gas 43 is burned with air in flue gas burner 45 and mingles with Claus offgas 41 at juncture 48 and the mingled flue gases 50 conveyed into heat exchanger 23. Recycle solids 53a from gasifier 24 deliver 0.21 tons/hour of sulfur into combustor 55 while oil vapors 58 from the gasifier convey 0.03 tons/hour of sulfur. Recycle solids 53b convey heat from combustor to gasifier. In combustor 55, 0.22 tons/hour of sulfur is released with combustor flue gas 43 while 0.02 tons/hour is discharged in slag 59.

Of the sulfur present in the charged lignite, 95 percent is recovered as sulfur in the Claus plant, 2 percent is bound in the slag formed in the slagging combustor, and 3 percent is lost from the $SO_2$ adsorber. This amount of $SO_2$ in the flue gas vented from the adsorber and baghouse is less than the EPA guideline for $SO_2$ emissions. The amount of sulfur adsorbed from the flue gas is equivalent to only 0.4 weight percent of the dry coal charge. Lignites have been shown to adsorb over 7 weight percent of sulfur, on a dry coal basis. Thus, the adsorptive capacity of the moving stream of coal particles is more than ample to desulfurize flue gas in a single gas/solids encounter thereby eliminating the costly carbon regeneration step of the prior art process. The residence time of coal in the adsorber may vary from 10 to 60 minutes, with a preferred range between 25 and 40 minutes.

Reference is now made to the following procedures and non-limiting examples.

ADSORPTION OF SULFUR DIOXIDE ON LIGNITE

Twenty-five grams of lignite having a moisture content of 25 weight percent was placed in a Nesbitt adsorption bottle and gaseous mixtures consisting of 1 to 2 volume percent of sulfur dioxide and 99 to 98 volume percent of nitrogen was passed up the bottle at a velocity of 0.5 to 1.0 feet/second. The gas flow was discontinued after adsorption of sulfur dioxide had ceased. On average, the adsorption rate was 1.5 grams sulfur dioxide/25 grams undried lignite. This corresponds to an average of 6.0 weight percent of the undried lignite or 8.0 weight percent of the dried coal. Table I summarizes the results of several examples carried out in accordance with the procedure aforesaid.

GASIFICATION OF LIGNITE WITH ADSORBED SULFUR DIOXIDE

Samples of lignite containing adsorbed sulfur dioxide as prepared above were charged over a 30 to 45 minute period into an electrically-heated gasifier up which steam was flowing. The reactor was a 1½ inch I.D. aluminized 310 stainless steel vessel. The coal bed was approximately 4 inches high at the start of the run. The steam flow rate up the gasifier was 0.5 feet/second. The reactor contained a one-quarter inch layer of sand on an orifice plate to support the coal. Gasification was continued one to two hours after the coal was charged.

Data for all examples is shown in Table II. In examples 9 and 10, the coal was dropped into the reactor onto the sand. In examples 11, 12 and 13 the feed was charged beneath the bed of a fluidized bed of inert char prepared from Western Kentucky coal. Such char does not react significantly with steam at the temperatures used to gasify the lignite/sulfur dioxide material. In all examples over 97 weight percent of the sulfur on the char was evolved as $H_2S$. Four of the five examples showed less than one weight percent of sulfur as $SO_2$. No COS was found in any examples and only traces of $SO_3$ were found in two of the examples. Sulfur balances were good in all examples.

The sulfur dioxide adsorption capacities of bituminous and subbituminous coal were determined following the procedure used for lignite. Table III lists the analysis of these coals while Table IV shows the amount of sulfur dioxide that was adsorbed on each undried coal. Two $SO_2$ adsorbers were used to study the effect of residence time on $SO_2$ adsorption at two $SO_2$ concentrations, 0.1–0.2 and 1.0 volume percent. In examples 14, 15, 16 and 17, a Nesbitt bottle was used while glass tubes with a larger L/D (length/diameter) were used in examples 18 and 19. $SO_2$ adsorption increased with increases in both the $SO_2$ concentration, and the gas residence times within the bed of coal. Depending on operating conditions, the subbituminous coal adsorbed from 5.3 to 14.5 weight percent $SO_2$ on a dry coal basis, and the Illinois coal adsorbed from 2.7 to 11.6 weight percent $SO_2$.

GASIFICATION OF SUBBITUMINOUS AND BITUMINOUS COALS CONTAINING ADSORBED SULFUR DIOXIDE

The gasification of the bituminous coal containing adsorbed sulfur dioxide was carried out in the same equipment as used with the lignite/$SO_2$ coal. However, the bituminous coal/$SO_2$ complex was mixed with an equal weight of coal ash to prevent agglomeration of the bituminous coal. Gasification was carried out at 1600° F. Sulfur distribution in the off gases was as follows:

| | |
|---|---|
| $SO_3$ | 4.4 weight percent |
| $SO_2$ | 0.1 weight percent |
| $H_2S$ | 94.8 weight percent |
| COS | None |

During gasification, 10.2 weight percent of oil was recovered. This oil presumably flashed off the coal at the 1600° F. temperature. When this same coal was pyrolyzed in the same reactor by the normal coal evaluation procedure, which consists of raising the temperature slowly from 600° to 1000° F. over a one hour period and maintaining the char at 1000° F. for one hour, the oil yield was 14.0 weight percent. Thus, only about 30 weight percent of the oil was cracked under the conditions used, at the 1600° F. gasification temperature.

A sample of the subbituminous coal from the Westmoreland Resources Co. containing adsorbed $SO_2$ was gasified at 1450° F. The same aforesaid ash-coal charging technique was used in this example also. An oil yield of 4.6 weight percent on the dry coal basis was obtained. Of the sulfur compounds recovered from the gas product, 87.4 weight percent was recovered as $H_2S$. No $SO_3$ or COS was detected.

TABLE I
ADSORPTION OF SULFUR DIOXIDE ON UNDRIED LIGNITE

| Example | Temperature °C. | Sulfur Dioxide Concentration Weight Percent | Grams Sulfur Dioxide Adsorbed On 25 Grams |
|---|---|---|---|
| | 70 | 1.0 | 2.4, 1.0, 1.6, 1.7[a] |
| 2 | 70 | 1.5 | 1.23, 1.50 |
| 3 | 70 | 2.0 | 1.44 |
| 4 | 130 | 1.0 | 1.5 |
| 5 | 130 | 1.5 | 1.1, 1.5 |
| 6 | 195 | 1.0 | 1.5, 1.0 |
| 7 | 195 | 1.5 | 2.42, 1.5 |
| 8 | 250 | 1.0 | 1.2 |

[a]3.47 grams was adsorbed on 50 grams lignite in a double-batch experiment.

TABLE II
GASIFICATION OF LIGNITE CONTAINING ADSORBED SULFUR DIOXIDE

| Example | Temp. °F. | Yield Oil Percent | Sulfur Recovered As Hydrogen Sulfide Percent | Sulfur Distribution Weight Percent | | | |
|---|---|---|---|---|---|---|---|
| | | | | $H_2S$ | $SO_2$ | COS | $SO_3$ |
| 9 | 1300 | 1.2 | 94.8 | 97.4 | 2.6 | ND[1] | ND |
| 10 | 1200 | 3.2 | 92.9 | 99.2 | 0.8 | ND | ND |
| 11 | 1450 | 1.6 | 98.9 | 99.2 | 0.8 | ND | ND |
| 12 | 1300 | 1.0 | 99.0 | 99.5 | 0.4 | ND | Trace |

TABLE II-continued
GASIFICATION OF LIGNITE CONTAINING ADSORBED SULFUR DIOXIDE

| Example | Temp. °F. | Yield Oil Percent | Sulfur Recovered As Hydrogen Sulfide Percent | Sulfur Distribution Weight Percent | | | |
|---|---|---|---|---|---|---|---|
| | | | | $H_2S$ | $SO_2$ | COS | $SO_3$ |
| 13 | 1200 | 0.8 | — | 99.5 | 0.5 | ND | Trace |

[1]ND = None Detected

TABLE III
ANALYSIS OF COALS

| | Coal Source | |
|---|---|---|
| | Illinois No. 6 Peabody No. 10 Mine | Subbituminous Westmoreland Resources |
| Coal Size, Tyler Mesh | 20 × 70 | 20 × 60 |
| Moisture, Weight Percent | 7.4 | 26.1 |
| Ultimate Coal, Weight Percent, Dry Basis: | | |
| C | 69.2 | 68.2 |
| H | 5.1 | 4.7 |
| N | 1.3 | 0.9 |
| S | 4.4 | 0.7 |
| O | 9.2 | 16.1 |
| Ash | 10.8 | 9.4 |

TABLE IV
ADSORPTION OF SULFUR DIOXIDE ON SUBBITUMINOUS AND BITUMINOUS COALS

| Example | Coal | $SO_2$ Conc. Vol. Percent | Flow Rate Ft./Sec. | Res. Time Sec. | $SO_2$ Adsorbed on Coal Weight Percent | |
|---|---|---|---|---|---|---|
| | | | | | As Is | Dry Basis |
| 14 | Subbituminous | 1.0 | 0.08 | 1.3 | 6.0 | 8.1 |
| 15 | Subbituminous | 0.1 | 0.08 | 1.3 | 3.9 | 5.3 |
| 16 | Bituminous | 1.0 | 0.08 | 1.3 | 4.6,4.8 | 5.1 |
| 17 | Bituminous | 0.2 | 0.08 | 1.3 | 2.5,3.8 | 2.7,4.1 |
| 18 | Subbituminous | 1.0 | 0.07 | 12.7 | 8.6,10.7 | 11.5,14.5 |
| 19 | Bituminous | 1.0 | 0.07 | 12.7 | 7.0,10.7 | 7.6,11.6 |

I claim:

1. In the gasification of carbonaceous solids with steam to give product gas containing carbon monoxide and hydrogen wherein the gasification is effected by feeding a stream of said solids and steam into a gasification reaction zone and wherein there is produced in conjunction with said gasification a sulfur dioxide containing flue gas formed in a combustion zone in which recycle solids are heated to provide the thermal requirements of the gasification reaction zone, the improvement of removing the sulfur dioxide from said flue gas comprising the steps of:

(1) contacting said flue gas with at least a portion of said stream of carbonaceous solids so as to adsorb said sulfur dioxide thereon and produce carbonaceous solids charged with sulfur dioxide and purified flue gas;

(2) venting the purified flue gas;

(3) introducing the so charged carbonaceous solids into said gasification reaction zone whereby the adsorbed sulfur dioxide is reduced to free hydrogen sulfide whereby there is formed a gaseous mixture of said hydrogen sulfide with product gas;

(4) introducing said gaseous mixture into a separation zone wherein the hydrogen sulfide is removed from said gaseous mixture; and (5) recovering said product gas substantially free of sulfur.

2. The process according to claim 1 wherein said carbonaceous solids are lignite.

3. The process according to claim 1 wherein said carbonaceous solids are subbituminous coal.

4. The process according to claim 1 wherein the carbonaceous solids are bituminous coal.

5. The process according to claim 1 wherein the carbonaceous solids and flue gas are contacted countercurrently.

6. The process according to claim 1 wherein the carbonaceous solids are fluidized by the flue gas during the step of contacting the carbonaceous solids with the flue gas wherein sulfur dioxide in the flue gas is adsorbed on the carbonaceous solids.

7. The process according to claim 1 wherein the hydrogen sulfide is treated in a Claus Plant for sulfur recovery.

* * * * *